United States Patent
Golla et al.

(10) Patent No.: US 10,280,684 B2
(45) Date of Patent: May 7, 2019

(54) DUAL-TYPE SPEED CONTROL MECHANISM FOR A TURBINE

(71) Applicant: Halliburton Energy Services, Inc., Houston, TX (US)

(72) Inventors: Christopher Golla, Kingwood, TX (US); Daniel Winslow, Spring, TX (US); Neelesh Deolalikar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 660 days.

(21) Appl. No.: 14/440,377

(22) PCT Filed: Dec. 17, 2013

(86) PCT No.: PCT/US2013/075826
§ 371 (c)(1),
(2) Date: May 4, 2015

(87) PCT Pub. No.: WO2015/094192
PCT Pub. Date: Jun. 25, 2015

(65) Prior Publication Data
US 2016/0017660 A1 Jan. 21, 2016

(51) Int. Cl.
*E21B 4/02* (2006.01)
*F03B 13/02* (2006.01)
(Continued)

(52) U.S. Cl.
CPC .................. *E21B 4/02* (2013.01); *F01D 5/02* (2013.01); *F01D 15/10* (2013.01); *F01D 25/24* (2013.01);
(Continued)

(58) Field of Classification Search
CPC ... E21B 4/02; F01D 5/02; F01D 15/10; F01D 25/24; F03B 13/62; G05D 13/62; F06D 2220/20; F06D 2220/76
(Continued)

(56) References Cited

U.S. PATENT DOCUMENTS 6,092,610 A * 7/2000 Kosmala .................. E21B 4/20
175/27
2005/0064978 A1* 3/2005 Moore .................... F16H 48/08
475/231
(Continued)

FOREIGN PATENT DOCUMENTS

CN 1299915 A 6/2001
WO 2010-065409 A2 6/2010
WO 2012-158575 A2 11/2012

OTHER PUBLICATIONS

International Search Report and Written Opinion issued in related PCT Application No. PCT/US2013/075826 dated Sep. 25, 2014, 13 pages.
(Continued)

*Primary Examiner* — Matthew R Buck
*Assistant Examiner* — Patrick F Lambe
(74) *Attorney, Agent, or Firm* — Alan Bryson; Baker Botts L.L.P.

(57) ABSTRACT

According to aspects of the present disclosure, systems and methods for controlling the speed of a fluid-controlled drive mechanism are described herein. An example system may include a housing, a variable flow fluid pathway disposed within the housing, an electromagnet coupled to the housing, a fluid-controlled drive mechanism in fluid communication with the variable flow fluid pathway, and a load-generating assembly coupled to the fluid-controlled drive mechanism. An example method may include altering a variable flow fluid pathway disposed within a housing, wherein the vari-
(Continued)

able flow fluid pathway is in fluid communication with a fluid-controlled drive mechanism, and generating an electrical current through an electromagnet, wherein the electromagnet is coupled to the housing.

18 Claims, 4 Drawing Sheets

(51) Int. Cl.
*F01D 5/02* (2006.01)
*F01D 15/10* (2006.01)
*F01D 25/24* (2006.01)
*G05D 13/62* (2006.01)

(52) U.S. Cl.
CPC ............. *F03B 13/02* (2013.01); *G05D 13/62* (2013.01); *F05D 2220/20* (2013.01); *F05D 2220/76* (2013.01)

(58) Field of Classification Search
USPC .......................................................... 175/92
See application file for complete search history.

(56) References Cited

U.S. PATENT DOCUMENTS

| 2009/0151790 | A1* | 6/2009 | Ranjan | .................... | E21B 34/02 |
| | | | | | 137/1 |
| 2010/0187009 | A1* | 7/2010 | Siher | ....................... | E21B 4/006 |
| | | | | | 175/57 |
| 2010/0243265 | A1* | 9/2010 | Sherrill | ............... | E21B 41/0085 |
| | | | | | 166/373 |

OTHER PUBLICATIONS

International Preliminary Report on Patentability issued in related Application No. PCT/US2013/075826, dated Jun. 30, 2016 (9 pages).

\* cited by examiner

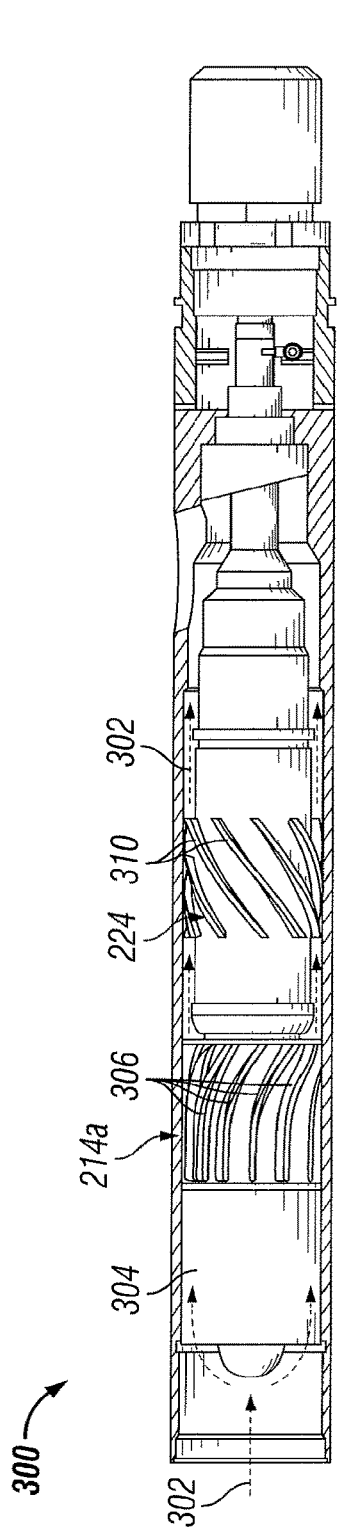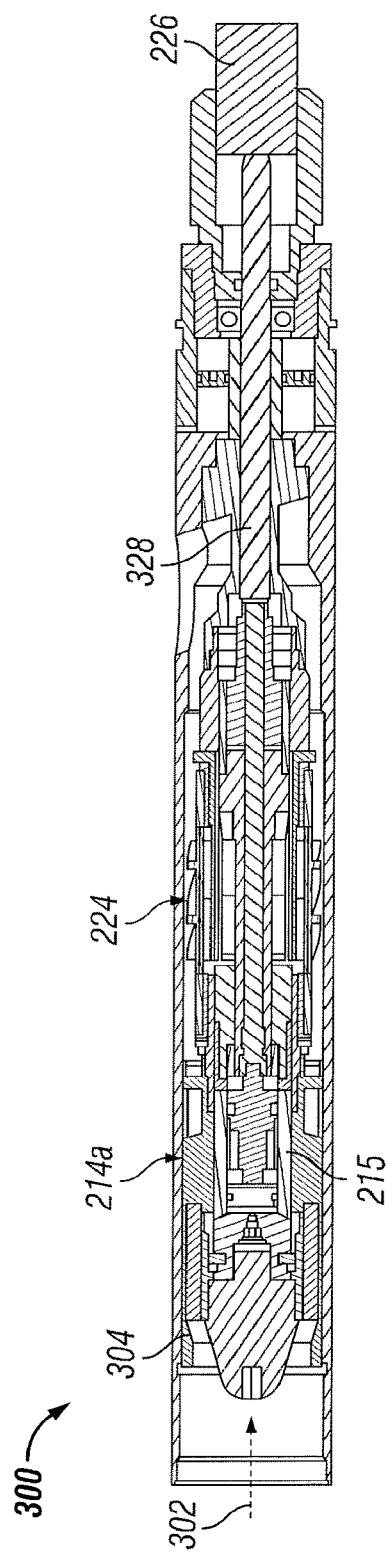

DUAL-TYPE SPEED CONTROL MECHANISM FOR A TURBINE

CROSS-REFERENCE TO RELATED APPLICATION

The present application is a U.S. National Stage Application of International Application No. PCT/US2013/075826 filed Dec. 17, 2013, which is incorporated herein by reference in its entirety for all purposes.

BACKGROUND

The present disclosure relates generally to well drilling operations and, more particularly, to speed control of a downhole turbine.

As well drilling operations become more complex, and hydrocarbon reservoirs more difficult to reach, the need to precisely and quickly change the speed of a downhole turbine increases. Current mechanisms for changing the speed of the turbine may require an operator to change out parts of the turbine which may be expensive and not time-effective. Further, current methods of operating turbines may cause bearings located either on a turbine or located downhole of a turbine to wear out quickly, and the operator may need to replace the bearings or other parts in the bottom hole assembly. Further, if the turbine is coupled to a generator, the electronics for the generator may be designed to operate efficiently at a given speed range of the turbine. When the turbine speed is not controlled properly, electronics in the bottom hole assembly may wear out. This may lead to a higher-cost, less-reliable system.

FIGURES

Some specific exemplary embodiments of the disclosure may be understood by referring, in part, to the following description and the accompanying drawings.

FIG. 1 is a diagram illustrating an example drilling system, according to aspects of the present disclosure.

FIGS. 2A-C are diagrams illustrating an example steering assembly, according to aspects of the present disclosure.

FIGS. 3A and 3B depict the outer surfaces and cross-sectional views of an example steering assembly, according to aspects of the present disclosure.

Figure 1:
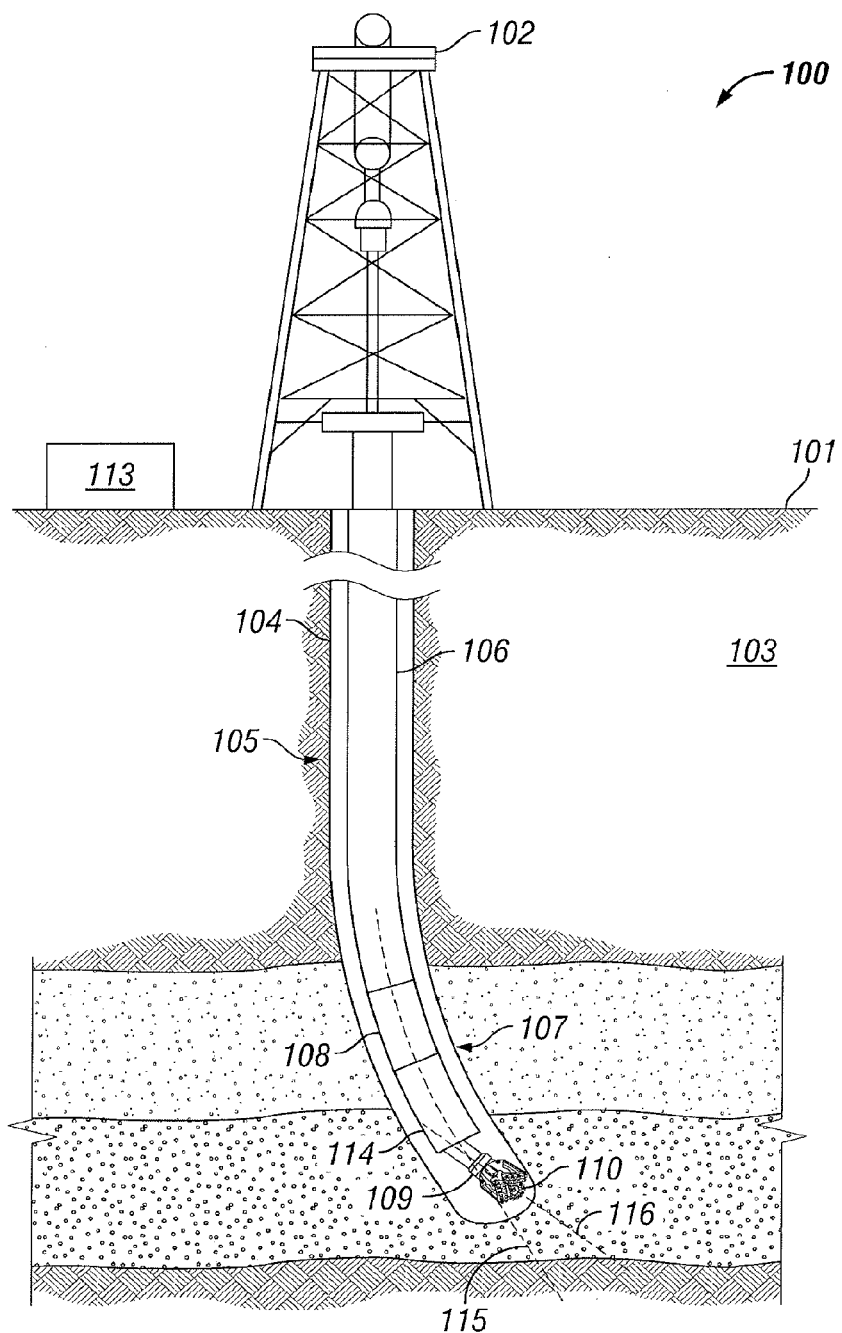

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to speed control of a fluid-controlled drive mechanism using one or both of a variable flow pathway and electromagnetic elements.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. The information handling system may further include a microcontroller, which may be a small computer on a single integrated circuit containing a processor core, memory, and programmable input/output peripherals. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near-surface construction purposes or borehole u-tube pipelines used for the transportation of fluids such as hydrocarbons. Embodiments described below with respect to one implementation are not intended to be limiting.

According to aspects of the present disclosure, systems and methods for controlling the direction of a drilling assembly within a borehole are described herein. An example system may comprise a housing and a variable flow fluid pathway within the housing. A fluid-controlled drive mechanism may be in fluid communication with the variable flow fluid pathway. Additionally, an offset mandrel may be coupled to an output of the fluid-controlled drive mechanism. The offset mandrel may be independently rotatable with respect to the housing. In certain embodiments, the system may also include a bit shaft pivotably coupled to the housing. The bit shaft may be coupled to an eccentric receptacle of the offset mandrel, and the housing may be configured to impart torque on the bit shaft. As will be described below, the bit shaft may be coupled to a drill bit, and the torque imparted on the bit shaft by the housing may drive the drill bit. The fluid-controlled drive mechanism may counter-rotate the offset mandrel with respect to the housing, which may maintain an angular orientation of the offset mandrel, bit shaft, and drill bit with respect to the surrounding formation during drilling operations. The counter-rotation speed of the offset mandrel may be varied by controlling the speed of the fluid-controlled drive mechanism. The speed of the fluid-controlled drive mechanism may be controlled by varying a flow of drilling fluid within the variable flow pathway, with which the flow-controlled drive mechanism is in fluid communication. However, this disclosure is not intended to be limited to rotary steerable applications. The systems and methods disclosed herein may also be used, for example, in LWD or MWD applications. Other applications may include, but are not limited to, using LWD/MWD sensors to sense parameters in a particular circumferential direction. Another application would include eliminating acceleration effects that adversely affect sensor measurements by keeping the sensor sonde geostationary. Another application may include a generator rotating at a constant RPM, generating constant voltage which may eliminate the need for complex/bigger electronics required for varying voltage situations.

FIG. 1 is a diagram illustrating an example drilling system 100, according to aspects of the present disclosure. The drilling system 100 includes rig 102 mounted at the surface 101 and positioned above borehole 104 within a subterranean formation 103. In the embodiment shown, a drilling assembly 105 may be positioned within the borehole 104 and may be coupled to the rig 102. The drilling assembly 105 may include drill string 106 and bottom hole assembly (BHA) 107. The drill string 106 may include a plurality of segments threadedly connected. The BHA 107 may include a drill bit 109, a measurement-while-drilling (MWD) apparatus 108 and a steering assembly 114. The steering assembly 114 may control the direction in which the borehole 104 is being drilled. As will be appreciated by one of ordinary skill in the art in view of this disclosure, the borehole 104 will be drilled in the direction perpendicular to the tool face 110 of the drill bit 109, which corresponds to the longitudinal axis 116 of the drill bit 109. Accordingly, controlling the direction of the borehole 104 may include controlling the angle between the longitudinal axis 116 of the drill bit 109 and longitudinal axis 115 of the steering assembly 114, and controlling the angular orientation of the drill bit 109 relative to the formation 103.

According to aspects of the present disclosure that will be described below, the steering assembly 114 may include an offset mandrel (not shown) that causes the longitudinal axis 116 of the drill bit 109 to deviate from the longitudinal axis 115 of the steering assembly 114. The offset mandrel may be counter-rotated relative to the rotation of the drill string 106 to maintain an angular orientation of the drill bit 109 relative to the formation 103. The steering assembly 114 may receive control signals from a control unit 113. Though the control unit 113 is shown at the surface in FIG. 1, it may be located at the surface, downhole, or at a remote location. The control unit 113 may include an information handling system and computer-readable media, and it may communicate with the steering assembly 114 via a telemetry system. In certain embodiments, as will be described below, the control unit 113 may transmit control signals to the steering assembly 114 to alter the longitudinal axis 115 of the drill bit 109 as well as to control counter-rotation of portions of the offset mandrel to maintain the angular orientation of the drill bit 109 relative to formation 103. As used herein, maintaining the angular orientation of a drill bit 109 relative to the formation 103 may be referred to as maintaining the drill bit 109 in a "geo-stationary" position. In certain embodiments, an information handling system and computer-readable media may be located within the steering assembly 114 to perform some or all of the control functions. Moreover, other BHA 107 components, including the MWD apparatus 108, may communicate with and receive instructions from control unit 113.

In certain embodiments, the drill string 106 may be rotated to drill the borehole 104. The rotation of the drill string 106 may in turn rotate the BHA 107 and drill bit 109 with the same rotational direction and speed. The rotation may cause the steering assembly 114 to rotate about its longitudinal axis 115, and the drill bit 109 to rotate around its longitudinal axis 116 and the longitudinal axis 115 of the steering assembly 114. The rotation of the drill bit 109 about its longitudinal axis 116 is desired to cause the drill bit 109 to cut into the formation, but the rotation of the drill bit 109 about the longitudinal axis 115 of the steering assembly 114 may be undesired in certain instances, as it changes the angular orientation of the drill bit 109 relative to the formation 103. For example, when the longitudinal axis 116 of the drill bit 109 is at an angle from the longitudinal axis of the drill string 115, as it is in FIG. 1, the drill bit 109 may rotate about the longitudinal axis 115 of the steering assembly 114, preventing the drilling assembly 100 from drilling at a particular angle and direction.

Figure 2A:
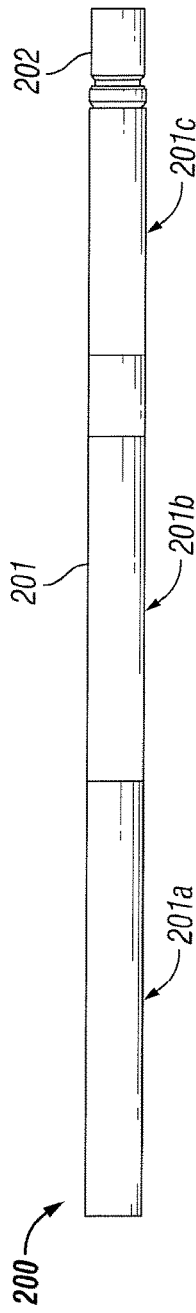
Figure 2B:
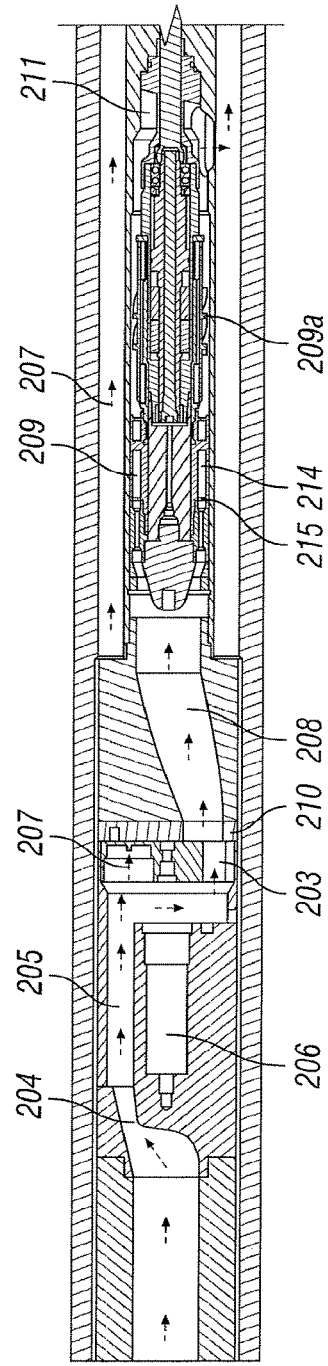
Figure 2C:
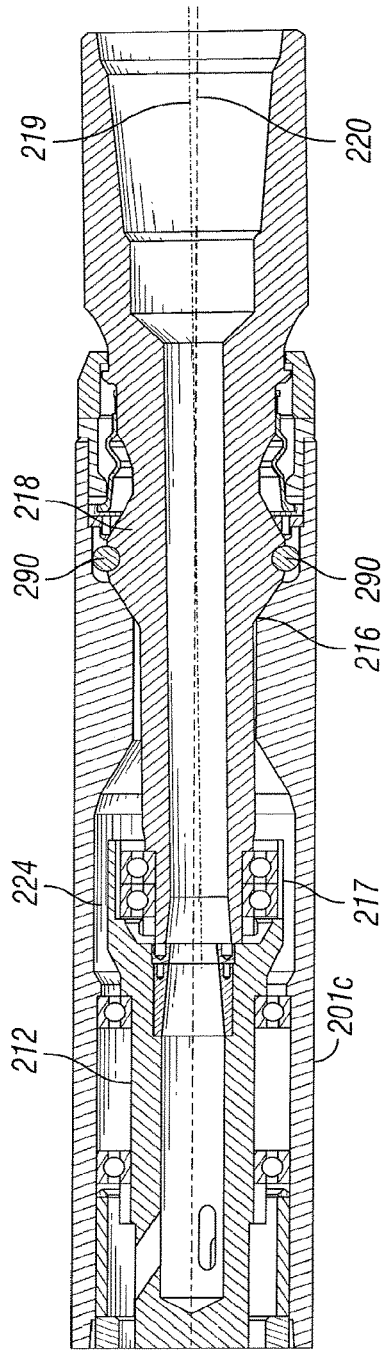

FIGS. 2A-C are diagrams illustrating an example steering assembly 200, according to aspects of the present disclosure, that may be used, in part, to control the speed of a turbine during drilling operations. FIGS. 2B-C depict illustrative portions of the steering assembly 200. As will be described below, the steering assembly 200 may include a housing 201 that may be coupled directly to a drill string or indirectly to a drill string, such as through a MWD apparatus. The housing 201 may include separate segments 201a-c, or may include a single unitary housing. In certain embodiments, as will be described below, each of the segments may correspond to a separate instrument portion of the steering assembly 200. For example, section 201a may house the control mechanisms, and may communicate with the control unit 113 and/or receive control signals from the surface and control mechanisms within the steering assembly 200. In certain embodiments, the control mechanisms may include an information handling system and computer-readable media and may receive measurements from position sensors within the steering assembly 200, such as gravity toolface sensors that may indicate a drilling direction. Section 201b may include drive elements, including a variable flow pathway and a flow-controlled drive mechanism. Section 201c may include steering elements that control the drilling angle and axial orientation of a drill bit coupled to bit shaft 202 of the steering assembly 200.

In certain embodiments, the steering assembly 200 may be coupled, directly or indirectly, to a drill string, through which drilling fluid may be pumped during drilling operations. The drilling fluid may flow through one or more ports 204 into an annulus 205 around a flow control module 206. Once in the annulus 205, the drilling fluid may either flow to an inner annulus 208, in fluid communication with a fluid-controlled drive mechanism 209, or may be diverted to a bypass annulus 207.

As described above, the steering assembly 200 may include a fluid-controlled drive mechanism 209 in fluid communication with the variable flow fluid pathway 203 via the inner annulus 208. In the embodiment shown, the fluid-controlled drive mechanism 209 includes a turbine, but other fluid-controlled drive mechanisms are possible, including, but not limited to, a mud motor. The fluid-controlled drive mechanism 209 may include a plurality of rotors 209a and stators 214a that generate rotational movement in response to fluid flow within the inner annulus 208. The turbine 209 may generate rotation at an output shaft 211, which may be coupled, directly or indirectly, to an offset mandrel 212.

The output shaft 211 may be coupled, directly or indirectly, to an offset mandrel 212. The output shaft 211 may impart rotation from the turbine 209 to the offset mandrel 212, such that the offset mandrel 212 may be rotated independently from the housing 201. The offset mandrel 212 may be coupled to the output shaft 211 at a first end and may include an eccentric receptacle 217 at a second end. The bit shaft 216 may be at least partially disposed within the eccentric receptacle 217. The eccentric receptacle 217 may be used to alter or maintain a longitudinal axis 219 of the bit shaft 216 and a drill bit (not shown) coupled to the bit shaft 216.

The bit shaft 216 may be pivotally coupled to the housing 201 at pivot point 218. As can be seen, the bit shaft 216 may pivot about the pivot point 218 to alter a longitudinal axis 219 of the bit shaft 216. In certain embodiments, the eccentric receptacle 217 may cause the bit shaft 216 to pivot about pivot point 218, which may offset the longitudinal axis 219 of the bit shaft 216 relative to the longitudinal axis 220 of the steering assembly 200. In addition to allowing the bit shaft 216 to pivot relative to the housing 201, the pivot point 218 may also be used to impart torque from the housing 201 to the bit shaft 216. The torque may be imparted to a drill bit (not shown) that is coupled to the bit shaft 216 and that may share the longitudinal axis 219 of the bit shaft 216. The longitudinal axis 219 of the bit shaft 216 may therefore correspond to a drilling angle of the steering assembly 200.

During drilling operations, a drill string coupled to the housing 201 may be rotated, causing the housing 201 to rotate around the longitudinal axis 220. The rotation of the housing 201 may be imparted to the bit shaft 216 as torque through pivot point 218 using balls 290. The torque may cause the bit shaft 216 to rotate about its longitudinal axis 219 as well as the longitudinal axis 220 of the steering assembly 200. When the longitudinal axis 219 of the bit shaft 216 is offset relative to the longitudinal axis 220 of the steering assembly 200, this may cause the end of the bit shaft 216 to rotate with respect to the longitudinal axis 220, changing the angular direction of the bit shaft 216 and corresponding bit with respect to the surrounding formation.

In certain embodiments, the offset mandrel 212 may be counter-rotated relative to the housing 201 to maintain the angular orientation of the bit shaft 216. For example, a drill string may be rotated in a first direction at a first speed, causing the steering assembly 200 to rotate at the first direction and the first speed. To maintain the angular orientation of the bit shaft 216 with respect to the surrounding formation, the variable flow pathway 203 may be controlled to allow a flow of drilling fluid across the fluid-controlled drive mechanism 209 such that the offset mandrel 212 is rotated in a second direction, opposite the first direction, at a second speed, the same as the first speed. Notably, with the offset mandrel 212 rotating opposite the housing 201 at the same speed, the eccentric end 217 of the offset mandrel 212 may remain stationary with respect to the surrounding formation (geo-stationary), maintaining the angular orientation of the bit shaft 216 relative to the formation while still allowing the bit shaft 216 to rotate about its longitudinal axis 219. Likewise, the angular orientation of the bit shaft 216 may be altered relative to the surrounding formation by rotating the offset mandrel 212 at any other speed than the rotational speed of the housing 201.

In several situations it may be necessary or desirable to control the speed of the fluid-controlled drive mechanism 209 due to a change in input or a change in target output. For example, the fluid flow coming through the port 204 may be fluctuating, and it may be desirable to keep the speed of the fluid-controlled drive mechanism 209 constant. The foregoing is only one example, however, and is not meant to be limiting.

Therefore, a flow control valve 210 may be included within the flow control module 206. The flow control valve 210 may control the amount/flow of drilling fluid that enters the inner annulus 208 to drive the fluid-controlled drive mechanism 209. In certain embodiments, the fluid pathway from port 204 to inner annulus 208 may include a variable flow fluid pathway 203, with the fluid-controlled drive mechanism 209 being in fluid communication with the variable flow fluid pathway 203 via inner annulus 208. The flow control valve 210 may be disposed within the variable flow fluid pathway 203, and configured to vary or change the fluid flow through the variable flow fluid pathway 203. According to aspects of the present disclosure, the rotational speed of the fluid-controlled drive mechanism 209 may be controlled by the mass flow rate of drilling fluid that flows into the inner annulus 208. In certain embodiments, the flow control valve 210, therefore, may be used to control the rotational speed of the fluid-controlled drive mechanism 209 by varying the mass flow rate of drilling fluid that flows into the inner annulus 208. As would be appreciated by one of ordinary skill in the art in view of this disclosure, other variable flow fluid pathways are possible, using a variety of valve configurations that may meter the flow of drilling fluid across a fluid-controlled drive mechanism. For example, the flow control valve 210 may include a shear valve, poppet valve, ball valve, globe valve, or any other type of mechanical means that may control the flow of drilling fluid, but the flow control valve 210 disclosed herein is not intended to be limited to the foregoing examples.

In certain embodiments, the fluid-controlled drive mechanism 209 may include an RPM sensor (not shown). The RPM sensor may be operable to continuously monitor the speed of the fluid-controlled drive mechanism 209. The desired speed of the fluid-controlled drive mechanism 209, i.e., the setpoint, may be continuously compared with the actual speed of the fluid-controlled drive mechanism 209. The RPM sensor may be coupled to electronics (not shown) located either downhole, at the surface, or at a remote location. The electronics (not shown) associated with the RPM sensor may issue error signals, which may be processed to relate the fluid-controlled drive mechanism 209 speed to a change in the position of the flow control valve 210 in order to achieve the setpoint. The flow control valve 210 may then change position, thus altering the flow of the fluid passing through to the fluid-controlled drive mechanism 209, resulting in a change in the speed of the fluid-controlled drive mechanism 209. This process may repeat until the fluid-controlled drive mechanism 209 is rotating at the setpoint (or within an allowable error band).

In certain embodiments, electromagnetic elements may be used to control the speed of the fluid-controlled drive mechanism 209. Electromagnetic elements may be used either alone or in combination with the flow control valve 210 such that more than one mechanism may control the speed of the fluid-controlled drive mechanism 209. This may be advantageous because while the flow control valve 210 may be able to control speed over a broad range, its effects may be slow to implement. On the other hand, use of electromagnetic elements may be used to make more fine speed adjustments to the fluid-controlled drive mechanism 209 but the effects of the fluid may be implemented quickly. Use of mechanical elements such as the flow control valve 210 in combination with electromagnetic elements may allow an operator to make broad or fine speed adjustments to a fluid-controlled drive mechanism 209 quickly. Electromagnetic elements may include, but are not intended to be limited to, electrorheological (ER) and/or magnetorheological (MR) fluid, or electromagnets.

In some embodiments, a generator (not shown) may be coupled to the fluid-controlled drive mechanism 209. In certain situations, the generator may be producing changing electrical loads and/or the fluid in the inner annulus 208 may be traveling at a variable rate. When higher electrical loads are present on the generator, the speed of the fluid-controlled drive mechanism 209 may slow down. Further, if the speed of the generator drops too low, it may not produce the required voltage since the voltage output of the generator is proportional to the speed of the generator. Thus, one way to control the speed of the fluid-controlled drive mechanism 209 is to control the electrical load on the generator. In the embodiment shown in FIGS. 2B-2C, the generator may be coupled to a rotor 209a of the fluid-controlled drive mechanism 209. The fluid-controlled drive mechanism 209 may additionally include a stator 214. The stator 214a may be magnetically coupled to the rotor 209a via an electromagnet 215 coupled to the rotor 209a. As the fluid-controlled drive mechanism 209 rotates, so does the rotor 209a, which may cause the electromagnet 215 to rotate around the stator 214. This may generate an electrical current within the generator, which may be used to power a variety of control mechanisms and sensors located within the steering assembly 200, including control mechanisms within segment 201a. By controlling the resistance in the electrical circuit attached to the generator, the current through the generator and hence by extension, the torque on the fluid-controlled drive mechanism 209 may be controlled. This may result in speed control of the fluid-controlled drive mechanism 209.

In other embodiments, electromagnetic elements may include MR or ER fluids, for example, but are not intended to be limited to such. FIG. 3A depicts a view of the outer surfaces of a steering assembly 300 while FIG. 3B shows a cross-sectional view. The steering assembly 300 may include a flow way 302 to accommodate the flow of drilling fluid. The steering assembly 300 may include a sonde pressure housing 304 disposed in the flow way 302. The sonde pressure housing 304 may include the stator 214 having multiple stator blades 306 extending from the stator 214 into the flow way 302. The sonde pressure housing 304 may also include an impeller 224 having multiple impeller blades 310 extending from the impeller 224 into the flow way 302 to convert energy of the fluid flow as it exits the stator 214 into rotational energy. The stator 214 may be operable to accelerate and turn the fluid flow to a more suitable velocity and angle of incidence as the fluid flow exits the stator 214 and enters the impeller 224. One or more electromagnets 215 may be attached to the stator 214.

The impeller 224 may be coupled to a load-generating assembly 226 via a shaft 328. The load-generating assembly 226 may include a power-generating source, such as an electrical or hydraulic power source, a steering control mechanism, or a friction-inducing brake, but is not intended to be limited to such. The speed of the impeller 224 may be a function of the geometry of the impeller 224 and the stator 214a, the fluid flow rate, and the total load generated by the load-generating assembly 226. Fluid may enter the stator 214a and the impeller 224, causing the impeller to rotate due to energy transferred from the fluid flow. In order to control the speed of the impeller 224, a control load may be added to the system 300 by the load-generating assembly 226. The control load may be varied in order to adjust the speed of the impeller 224.

Figure 4:
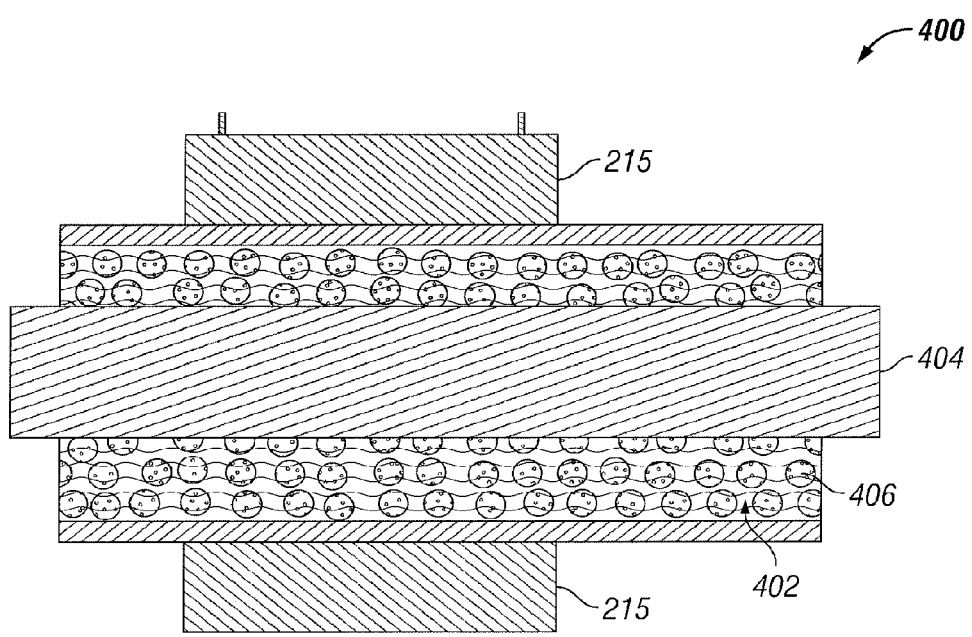
FIG. 4 depicts a cross-sectional view of a fluid chamber according to aspects of the present disclosure.

FIG. 4 depicts a fluid chamber denoted generally with numeral 400 that may be used to control the speed of the fluid-controlled drive mechanism using one or more electromagnetic elements. In some embodiments, the load-generating assembly 226 shown in FIG. 3B may include the fluid chamber 400. In other words, the fluid chamber 400 may be used as the control load. In other embodiments, the fluid chamber 400 may be included in the steering assembly 300 in the area denoted "B" on FIG. 3B. In other embodiments, the rotating shaft 404 of the fluid chamber 400 may be coupled to the rotor 209a shown in FIG. 2B. The fluid chamber 400 may include a rotating shaft 404 disposed within a cavity 402. The cavity 402 may contain MR or ER fluid 406, and therefore, the rotating shaft 404 may be immersed in MR or ER fluid 406. The torque required to rotate the rotating shaft 404 may be adjusted by applying a magnetic or electric field to the MR or ER fluid 406. For example, an electromagnet 215 may be coupled to the cavity 402, which contains the MR or ER fluid. When current is produced through the electromagnet 215, the viscosity of the fluid and therefore the load on the rotating shaft 404 may change. The higher the magnetic or electric field strength, the more torque will be required to rotate the rotating shaft 404. In other words, magnetic/electric field strength and required torque may be inversely proportional.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple" or "coupled" or any common variation as used in the detailed description or claims are not intended to be limited to a direct coupling. Rather, two elements may be coupled indirectly and still be considered coupled within the scope of the detailed description and claims.

What is claimed is:

1. A system comprising:
a housing;
a variable flow fluid pathway disposed within the housing;
a fluid-controlled drive mechanism in fluid communication with the variable flow fluid pathway;
a load-generating assembly coupled to the fluid-controlled drive mechanism; and
an electromagnet magnetically coupled to the fluid-controlled drive mechanism to vary the rotational speed of the fluid-controlled drive mechanism by producing a current through the electromagnet by altering a resistance in an electrical circuit of the load-generating assembly.

2. The system of claim 1, wherein the variable flow fluid pathway comprises a flow control valve configured to vary the fluid flow through the variable flow fluid pathway.

3. The system of claim 1, further comprising an offset mandrel coupled to an output of the fluid-controlled drive mechanism, wherein the offset mandrel is independently rotatable with respect to the housing.

4. The system of claim 1, wherein the fluid-controlled drive mechanism comprises one of a turbine and a mud motor.

5. The system of claim 1, wherein the load-generating assembly comprises a generator.

6. A method comprising:
altering a variable flow fluid pathway disposed within a housing by changing a fluid flow through the variable flow fluid pathway using a flow control valve, wherein the variable flow fluid pathway is in fluid communication with a fluid-controlled drive mechanism; and
generating an electrical current through an electromagnet coupled to the housing to vary the rotational speed of the fluid-controlled drive mechanism by altering a resistance of an electrical circuit of a load-generating assembly coupled to the fluid-controlled drive mechanism.

7. The method of claim 6, further comprising:
monitoring the speed of the fluid-controlled drive mechanism at a sensor; and
relating the speed of the fluid-controlled drive mechanism to a changing in position of the flow control valve.

8. The method of claim 6, wherein the fluid-controlled drive mechanism comprises one of a turbine and a mud motor.

9. The method of claim 6, wherein a generator is coupled to the fluid controlled drive mechanism.

10. The method of claim 6, wherein an offset mandrel is coupled to an output of the fluid-controlled drive mechanism, and wherein the offset mandrel is independently rotatable with respect to the housing.

11. The method of claim 6, further comprising:
introducing one of magnetorheological and electrorheological fluid into a cavity coupled to the housing.

12. The method of claim 6, further comprising:
introducing one of magnetorheological and electrorheological fluid into a cavity coupled to the fluid-controlled drive mechanism.

13. A method comprising:
positioning an assembly within a borehole, wherein the assembly comprises:
a housing;
a variable flow fluid pathway disposed within the housing;
a fluid-controlled drive mechanism in fluid communication with the variable flow fluid pathway;
an electromagnet coupled to the housing; and
a cavity coupled to the housing; and
varying the rotational speed of the fluid-controlled drive mechanism by producing current through the electromagnet to alter a resistance of an electrical circuit of a load-generating assembly coupled to the fluid-controlled drive mechanism.

14. The method of claim 13, further comprising:
varying a rotational speed of the fluid-controlled drive mechanism by altering the variable flow fluid pathway using a flow control valve.

15. The method of claim 13, wherein the fluid-controlled drive mechanism comprises one of a turbine and a mud motor.

16. The method of claim 13, wherein a generator is coupled to the fluid-controlled drive mechanism.

17. The method of claim 13, wherein the assembly further comprises an offset mandrel coupled to an output of the fluid-controlled drive mechanism, and wherein the offset mandrel is independently rotatable with respect to the housing.

18. The method of claim 13, further comprising:
introducing one of magnetorheological and electrorheological fluid into a cavity coupled to the housing.

* * * * *